United States Patent
Williams et al.

[11] Patent Number: 5,361,971
[45] Date of Patent: Nov. 8, 1994

[54] INTERMEDIATE-TEMPERATURE DIFFUSION WELDING

[75] Inventors: Ronald L. Williams, San Marcos; Joseph B. Tyra, Carlsbad, both of Calif.

[73] Assignee: Hughes Aircraft Company, Los Angeles, Calif.

[21] Appl. No.: 6,117

[22] Filed: Jan. 19, 1993

[51] Int. Cl.$^5$ .................. B23K 35/28; B23K 20/00
[52] U.S. Cl. .................. 228/193; 228/262.3; 228/262.6; 428/672
[58] Field of Search .............. 228/190, 193, 363.13, 228/263.18, 180.2, 180.21, 262.3, 262.6; 428/672, 680

[56] References Cited

U.S. PATENT DOCUMENTS

| | | | |
|---|---|---|---|
| 2,438,967 | 4/1948 | Ellsworth | 228/193 |
| 3,199,189 | 8/1965 | LaPlante | 228/190 |
| 3,970,433 | 7/1976 | Warmka et al. | 428/672 |
| 4,737,418 | 4/1988 | Slattery | 228/190 |
| 4,930,001 | 5/1990 | Williams | 357/71 |

FOREIGN PATENT DOCUMENTS 2-121786  5/1990  Japan .................. 228/193

*Primary Examiner*—P. Austin Bradley
*Assistant Examiner*—Jeffrey T. Knapp
*Attorney, Agent, or Firm*—W. C. Schubert; W. K. Denson-Low

[57] ABSTRACT

Two pieces (42, 46) are joined together by providing a gold bonding layer (44) overlying a nickel layer (40) on a first piece (42) to be bonded and providing a gold bonding layer (50) on a second piece (46) to be bonded. The gold layer (50) on the second piece (46) may optionally overlie a nickel layer (48) on the second piece (46). The gold layers (44, 50) are pressed together in a facing relation at a temperature of from about 125 C. to about 250 C. for a time sufficient to permit the layers (40, 44, 50, 46) to interdiffuse.

8 Claims, 1 Drawing Sheet

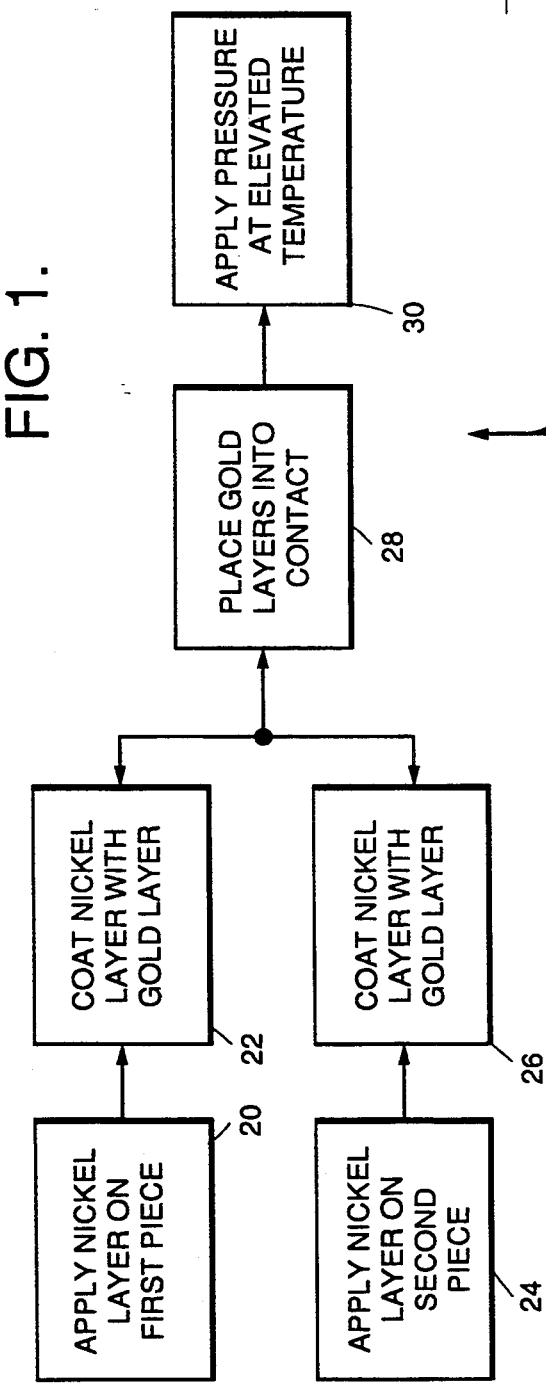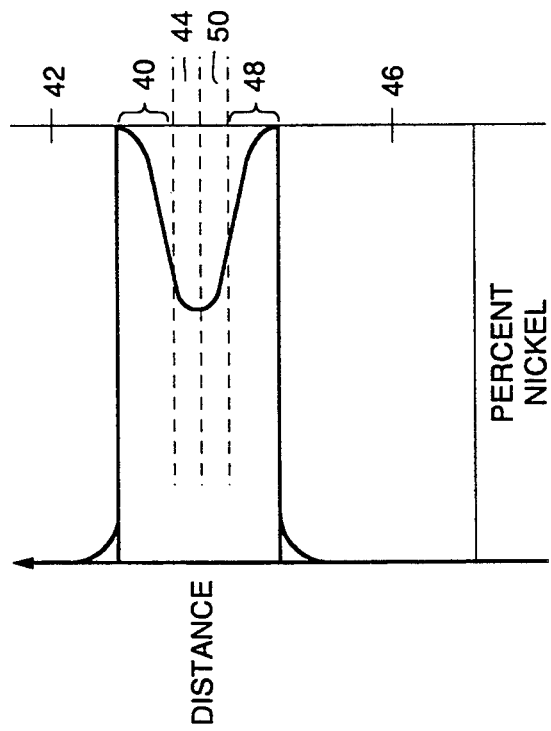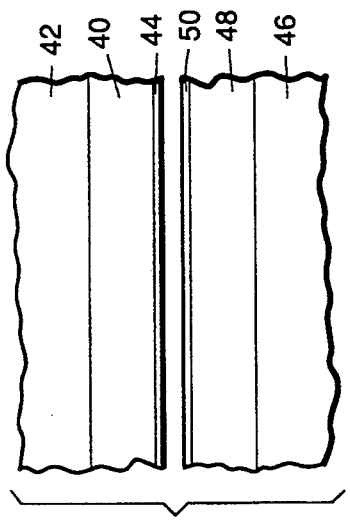

INTERMEDIATE-TEMPERATURE DIFFUSION WELDING

BACKGROUND OF THE INVENTION

This invention relates to the Joining and bonding of articles, and, in particular, to a diffusion welding process.

The need to mechanically, electrically, or thermally join articles or pieces together arises in a wide range of situations, and many techniques have been developed. In the manufacture of microelectronic devices, for example, it is often necessary to mechanically and/or electrically bond terminals together, and to mechanically bond substructures together. The bonding must be accomplished without damaging the microelectronic devices already present.

The most common approach to such bonding requirements in microelectronic devices is to solder the pieces together. In soldering, a pure metal or alloy having a low melting temperature is provided at the locations to be Joined. Lead-tin, lead-indium, and indium solders are widely used. Lead-tin solder is the familiar solder available in hardware stores, and the other solders are made for more specialized applications. The solder and surrounding regions to be joined are heated to a temperature sufficient to melt the solder and cause it to flow over the surfaces to be Joined. The heating is removed, and the parts are allowed to cool. As the parts cool, the solder solidifies to Join the parts together.

Soldering is widely used, but has drawbacks in some applications. In order to cause the solder to wet and flow over the surfaces to be bonded, it is usually necessary to utilize a flux that cleans the surfaces to be bonded before the solder melts. Fluxes are often corrosive compositions that clean the surface, but also leave a residue that can cause long-term damage to the microelectronic components. It may also be necessary to acid etch the surfaces to be bonded before soldering begins, to improve the adherence of the solder to the surface. The acid used in the etching may similarly lead to damage of the microelectronic device. Also, there are no known low-temperature solders suitable for microelectronic applications that have high strengths after bonding. Careful process control is required to achieve a good solder bond, including use of the correct temperature and atmosphere conditions. Finally, even with careful selection of the solder, proper surface preparation of the parts to be bonded, and close process control, there may be gaps or holes in the final solder Joint that greatly reduce its strength.

Soldering is expected to remain a viable Joining technique for many applications. In others, these drawbacks cause the technique to be less than satisfactory. There is a need for an improved Joining technique that can replace soldering in such applications. The present invention fulfills this need, and further provides related advantages.

SUMMARY OF THE INVENTION

The present invention provides a Joining technique for bonding two pieces together. It is particularly of interest in the microelectronics industry, but has broader applicability. The process is entirely solid state, with neither the pieces nor the bonding materials being melted during the process. No surface etching or flux is required in the bonding process. Process control requires only temperature control, which can normally be accomplished quite accurately. The preferred maximum process temperature is within the acceptable heating range for many microelectronic devices, which, if heated to too high a temperature, can themselves be damaged. The final bond is much stronger in tension and creep than that achieved by soldering with conventional low-temperature solders that are melted during the bonding process. The approach of the invention does require the ability to press together the surfaces being bonded, limiting its applicability to situations where pressing is possible and permitted.

In accordance with the invention, a method for joining two pieces together includes the step of providing a first bonding surface on a first piece to be bonded. The first bonding surface comprises a first region of a first material, and a first layer of a second material overlying the first region of the first material and having a different composition than the first material. The second material forms an adherent coating on the first material and resists oxidation at a temperature of from about 125 C. to about 250 C. The second material has a negligible solid solubility in the first material at a temperature of less than about 125 C. and an increasing, finite solid solubility in the first material at a temperature of more than about 125 C. The second material achieves sufficient interdiffusion into the first material at a temperature of from about 125 C. to about 250 C. to weld the first material and the second material together. The method further includes providing a second bonding surface on a second piece to be bonded. The second bonding surface is made of a third material that resists oxidation at a temperature of from about 125 C. to about 250 C. The third material achieves sufficient Interdiffusion into the second material at a temperature of from about 125 C. to about 250 C. to weld the second material and the third material together. The two bonding surfaces are pressed together at a temperature of from about 125 C. to about 250 C., preferably about 200 C., for a time sufficient to permit the first and second bonding surfaces to interdiffuse. The second material and the third material are preferably, but not necessarily, the same material. The pressing time is desirably no more than about 1 hour.

A number of different materials systems have been identified to meet the diffusional welding requirements. The most preferred combination is nickel as the first material, and gold as the second and third materials. In other examples of operable combinations, nickel may be the first material and tin the second and third materials; germanium may be the first material and tin the second and third materials; beryllium may be the first material and tin the second and third materials; and gold may be the first material and platinum the second and third materials. These examples are illustrative rather than limiting.

More specifically in the preferred approach, a method for Joining two pieces together comprises the steps of providing a gold-coated nickel bonding surface on a first piece to be bonded, providing a gold bonding surface on a second piece to be bonded, and pressing the two bonding surfaces together at a temperature of from about 125 C. to about 250 C. for a time sufficient to permit the bonding surfaces to interdiffuse. The preferred bonding temperature is about 200 C.

The temperature of bonding must be at least about 125 C. because of the near-zero solubility of the gold or other second material in the nickel or other first material at lower temperatures. Interdiffusion cannot occur in the absence of solubility. Experiments have demonstrated that the full interdiffusional and diffusion welding effects are attained at temperatures of no more than 250 C., and it is therefore not necessary to conduct the diffusion welding at higher temperatures. Moreover, higher temperatures lead to increased thermal and residual stresses in the bond and in the pieces being bonded upon the completion of the process, and are therefore to be avoided. Where the present invention is used in microelectronic device bonding applications, the presently preferred use, exposure of the device to temperatures above 250 C. can cause degradation in the microelectronic devices through enhanced diffusion. Thus, the diffusional welding range of the invention is an intermediate temperature range of from about 125 C. to about 250 C. If, however, any of the materials melts at a temperature of less than 250 C., the maximum temperature during diffusion welding should not exceed that melting temperature.

In the most preferred embodiment of the invention, a method for Joining two pieces together comprises the steps of providing a nickel layer on a first piece to be bonded and coating the nickel layer of the first piece with a gold layer in a thickness such that the amount of gold present is less than about 0.5 percent of the amount of nickel present. A second piece is treated similarly, by providing a nickel layer on a second piece to be bonded and coating the nickel layer of the second piece with a gold layer in a thickness such that the amount of gold is less than about 0.5 percent of the amount of nickel. The gold layers of the first piece and the second piece are placed into contact. The first piece and the second piece are pressed together at a temperature of from about 125 C. to about 250 C. for a time sufficient to permit the first piece and the second piece to interdiffuse.

The preferred embodiment of the present approach is a fully solid-state diffusional bonding or welding approach that is operable due to the ability of a thin gold layer of gold or other second material to protect the nickel or other first material from oxidation, and to interdiffuse with nickel or other first material in the temperature range of about 125 C. to about 250 C. Nickel will not pressure bond to nickel at such low temperatures and with moderate pressures, because nickel normally forms a nickel oxide at its surface that serves as a diffusion barrier to the interdiffusion, and because of the low self-diffusion rate of nickel at that temperature. The deposition of a thin layer of gold onto the surface of the nickel protects the nickel against oxidation, and also produces an increased interdiffusion rate due to the characteristics of the nickel-gold phase relationships.

In the preferred embodiment, at least one of the surfaces to be bonded must include a thin layer of gold deposited upon nickel. The nickel can be the material of construction of the underlying structure, or can be in the form of a nickel layer deposited over the underlying structure. The other surface to be bonded must have gold at the surface, to interdiffuse with the nickel-gold structure on the mating surface. It may also be in the form of a thin gold layer on nickel.

The bond produced by this approach is accomplished at moderate temperature and applied bonding pressures, and without the use of etches or fluxes. The approach of the Invention can be used where the structures to be bonded permit these bonding conditions. The final bond is quite strong in tension and creep, producing superior mechanical properties to those of solder joints made with low-temperature solders. Other features and advantages of the present invention will be apparent from the following more detailed description of the preferred embodiment, taken in conjunction with the accompanying drawings, which illustrate, by way of example, the principles of the invention.

BRIEF DESCRIPTION OF THE DRAWINGS

FIG. 1 is a process flow diagram for practicing a preferred embodiment of the invention;

FIG. 2 is a side elevational view of a preferred bonding configuration, Just prior to the commencement of bonding; and FIG. 3 is a schematic elevational view of a bonded Joint, with compositions indicated.

DETAILED DESCRIPTION OF THE INVENTION

FIG. 1 illustrates the preferred method steps of the invention, and FIGS. 2-3 show, for the preferred embodiment, the structure of the pieces being bonded, both before and after bonding. Referring to FIGS. 1 and 2, a nickel layer 40 is first applied to a first piece 42, numeral 20. As used herein, "nickel" includes both pure nickel and alloys of nickel containing other alloying elements. Alloys are acceptable, as long as no embrittling phases are formed during interdiffusion. For example, there should little or no lead present in the nickel alloy, as lead and gold form a brittle phase upon Interdiffusion. The first piece 42 may itself be made of nickel, and then the upper portion of the nickel piece is considered to be the layer 40. The nickel layer 40 is coated with a gold layer 44, numeral 22. The layer 44 can be pure gold, or an alloy of gold that does not form an embrittling phase during interdiffusion with the nickel layer 40.

The nickel layer and the gold layer may be of various thicknesses. However, the total amount of gold in the gold layer 44 preferably does not exceed about 0.5 percent by weight of the total amount of nickel in the nickel layer 40. If the amount of gold exceeds that value, the net composition of the interdiffused nickel and gold layer resulting from subsequent processing is no longer in a solid solution region of the phase diagram. Instead, the net composition lies in a miscibility gap region of the phase diagram. This relation is preferred, and not an absolute requirement. A partial interdiffusion or interdiffusion to a composition within the miscibility gap is acceptable, particularly If accomplished over a relatively large bonding surface area to ensure that there is a sufficiently large area over which any applied forces during service are distributed.

In a preferred embodiment, the nickel layer 40 was pure nickel and was applied by electroplating using the first piece 42 as the plating substrate. The plated nickel layer 40 was about 0.004 inches thick. The plated first piece 42 was placed into a vacuum deposition apparatus, and the surface of the nickel layer 40 was cleaned by ion cleaning to remove contaminants and nickel oxide. The gold layer 44 was pure gold and was applied by in-situ electron beam deposition following the deposition of the nickel layer 40. The gold layer 44 was about 4000 Angstroms (400 nanometers) thick. The vacuum was not broken between ion cleaning and gold deposition, so that the surface of the nickel layer 40 could not re-contaminate or re-oxidize prior to deposition of the gold layer 44.

A second piece 46 was provided with a nickel layer 48, see numeral 24 of FIG. 1, and a gold layer 50, see numeral 26 of FIG. 1, using the same techniques Just described for the first piece 42. However, this approach need not be followed. The bonding method works well if no nickel layer is provided on the second piece 46, as long as there is a gold layer 50 present on the second piece, or the second piece is entirely gold. In microelectronics, contacts are sometimes made entirely of gold or with a gold layer, and the present method is operable with such structures.

After the layers are deposited on the first and second pieces according to the approach described above, the first piece 42 and the second piece 46 are placed in contact, with the gold layers 44 and 50 in a facing relation, numeral 28. FIG. 2 illustrates this arrangement, Just before the layers 44 and 50 are contacted together. This contacting of the pieces 42 and 46 need not occur in vacuum or immediately after the pieces are removed from a vacuum, as the gold layers 44 and 50 do not rapidly oxidize or form other types of diffusion barriers. It is necessary, however, to ensure that the facing surfaces of the layers 44 and 50 are not contaminated with contaminants such as dirt or grease.

The first piece 42 and the second piece 46 are heated and pressed together at elevated temperature, numeral 30. The temperature must be at least about 125 C., because the gold and nickel do not significantly interdiffuse below that temperature. Thus, there is no substantial interdiffusion when the nickel/gold coated pieces are stored at ambient temperature prior to the interdiffusion process. The temperature should not be above about 250 C., because of the increasing thermal and residual stresses experienced when higher temperatures are used, the attainment of the full effect at lower temperatures, and possible damage to the articles being bonded together.

The pieces should be pressed together with a force sufficient to attain reasonably complete interfacial contact at the surfaces of the layers 44 and 50, promoting a strong bond. It is possible to magnify any applied forces at the bond line by geometrical techniques such as using bumps to concentrate the applied forces in a small area for bonding purposes. The effective applied force will therefore depend upon the geometry of the bonded region. The present bonding phenomenon is primarily a result of the application of a sufficiently high temperature, and pressure does not play a direct role except to promote Interfacial contact. The applied pressure is therefore not a primary variable to be considered in the diffusion welding operation.

The time required to bond the pieces together is dependent upon the bonding temperature. At a preferred bonding temperature of 200 C., the bonding was achieved in 60 minutes with an applied pressure of about 15,000 pounds per square inch. Other studies indicate that shorter times, as on the order of about 5–10 minutes, are also operable. Overly long diffusional treatments, such as a bonding time of 1 hour or more should not be used, inasmuch as diffusional damage to the pieces being bonded may result.

FIG. 3 depicts the compositional profile in the neighborhood of the bonded region after a degree of Interdiffusion. During Interdiffusion, the layers 40, 44, 48, and 50, whose boundaries are initially well defined, become less well defined as gold from the layer 44 interdiffuses with gold from the layer 50, gold from the layer 50 Interdiffuses with nickel from the layer 48, and gold from the layer 44 interdiffuses with nickel from the layer 40. Figure 3 shows an indication of where the layers were originally physically located by dashed lines, but the layers are no longer of their original compositions. The nickel layers 40 and 48 become a mixture of predominantly nickel and gold, while the gold layers 44 and 50 have a substantial nickel content. Eventually, the gold and nickel interdiffuse so that the composition becomes more nearly uniform across what was previously the layers 40, 44, 50, and 48, to complete the bonding operation. There is usually a small amount of interdiffusion of nickel from the nickel layers 40 and 48 into the respective pieces 42 and 46, which further aids in adhering the piece s 42 and 46 together through the into diffusion layer.

In a reduction to practice of the invention, the first piece 42 had a nickel layer 40 about 0.004 inches thick and a gold layer 44 about 4000 Angstroms thick. The second piece 46 was entirely gold. Bonding was achieved at a temperature of about 200 C. for 60 minutes, with an applied pressure of about 15,000 pounds per square inch. After bonding, when an attempt was made to remove the second piece 46 from the bonded Joint, failure occurred in the nickel rather than at the Joint. In other measurements, the nickel/gold alloy was found to have a tensile strength in excess of 18,000 psi (pounds per square inch). The nickel/gold alloy had a predicted creep strength of over 9000 psi. A typical lead-tin solder has a tensile strength of about 5500 psi and a creep strength of 300 psi. The bond of the present invention is considerably stronger than the conventional solder bond, probably because of the much higher melting points of its constituents.

Although a particular embodiment of the invention has been described in detail for purposes of illustration, various modifications may be made without departing from the spirit and scope of the invention. Accordingly, the invention is not to be limited except as by the appended claims.

What is claimed is:

1. A method for joining two pieces together to form a single article, comprising the steps of
providing a gold-coated nickel bonding surface on a first piece to be bonded;
providing a gold-coated nickel bonding surface on a second piece to be bonded; and
pressing the two bonding surfaces together at a temperature of from about 125 C. to about 250 C. for a time sufficient to permit the bonding surfaces to interdiffuse.

2. The method of claim 1, wherein the temperature during the step of pressing is about 200 C.

3. A method for joining two pieces together to form a single article, comprising the steps of
providing a nickel layer on a first piece to be bonded;
coating the nickel layer of the first piece with a gold layer in a thickness such that the amount of gold present is less than about 0.5 percent by weight of the amount of nickel present;
providing a nickel layer on a second piece to be bonded;
coating the nickel layer of the second piece with a gold layer in a thickness such that the amount of gold present is less than about 0.5 percent by weight of the amount of nickel present;
placing the gold layers of the first piece and the second piece into contact; and pressing the first piece and the second piece together at a temperature of from about 125 C. to about 250 C. for a time sufficient to permit the first piece and the second piece to interdiffuse.

4. The method of claim 3, wherein the first piece is made of nickel.

5. The method of claim 3, wherein the step of providing a nickel layer on a first piece includes the step of depositing a layer of nickel onto a surface of the first piece.

6. The method of claim 3, wherein the second piece is made of nickel.

7. The method of claim 3, wherein the step of providing a nickel layer on a second piece includes the step of depositing a layer of nickel onto a surface of the second piece.

8. The method of claim 3, wherein the temperature during the step of pressing is about 200 C.

* * * * *